United States Patent
Willard

[15] 3,657,604
[45] Apr. 18, 1972

[54] SHOCK PROTECTION DEVICE CIRCUIT

[72] Inventor: Henry G. Willard, Wethersfield, Conn.
[73] Assignee: General Electric Company
[22] Filed: Apr. 19, 1971
[21] Appl. No.: 135,118

[52] U.S. Cl..................317/18 D, 317/27 R, 317/33 SC, 317/40 R, 317/49, 317/53, 317/131
[51] Int. Cl..................................................H02h 3/34
[58] Field of Search.............317/18 D, 27 R, 53, 40 R, 49, 317/33 SC, 131

[56] References Cited

UNITED STATES PATENTS 3,506,906 4/1970 Nestor.............................317/18 D
3,512,045 5/1970 Tipton et al......................317/18 D Primary Examiner—James D. Trammell
Attorney—Robert T. Casey, Philip L. Schlamp, Frank L. Neuhauser, Oscar B. Waddell and Joseph B. Forman

[57] ABSTRACT

A ground fault protection circuit utilizing a differential transformer whose output is connected by means of a resistance-capacitance transient surge filter to a silicon controlled rectifier which, when turned on energizes a solenoid which trips a circuit breaker controlling a load circuit. The differential transformer, the resistance, and the capacitance are selected to constitute a circuit whose resonance changes with temperature in such a way as to produce an output which varies in amplitude in a manner closely matching and correcting for the inherent temperature-varying sensitivity of the silicon controlled rectifier.

20 Claims, 10 Drawing Figures

INVENTOR
HENRY G. WILLARD

BY Robert A. Casey
ATTORNEY

INVENTOR
HENRY G. WILLARD
BY Robert F. Casey
ATTORNEY

SHOCK PROTECTION DEVICE CIRCUIT

BRIEF SUMMARY OF THE INVENTION

Ground fault detection circuits using solid state devices have been developed and used in the past, both in the high-sensitivity area for purposes of electric shock protection and in the power area for purposes of detecting ground faults of substantial magnitude. Examples of such circuits in the electric shock protection area include U.S. Pat. Nos. 3,252,052 Nash, May 17, 1966, and 3,213,321 Dalziel, Oct. 19, 1965. An electric shock protection circuit using a solid state control device is also shown in application Ser. No. 76,828 Walden, filed Sept. 30, 1970 and assigned to the same assignee as the present invention. An example of a ground fault detection circuit for use in power applications is shown in U.S. Pat. No. 3,259,802 Steen, issued July 5, 1966 and assigned to the same assignee as the present invention. The Nash and Dalziel patents, in the field of electric shock protection, as well as the Steen patent in the field of power ground fault protection, do not include means to compensate for the inherent temperature-sensitive characteristics of solid state devices such as transistors and silicon controlled rectifiers.

In the aforementioned Walden application, ambient temperature correction is achieved by utilizing a pair of solid state devices in such a way that the temperature-sensitive characteristic of one solid state device offsets or corrects for the temperature sensitive characteristic of a companion solid state device. This arrangement, while effective, requires the use of two solid state devices rather than one, with corresponding increased complexity of the circuit and accompanying expense.

Other patents which include means for temperature compensation or correction or simply temperature control, include the following:

U.S. Pat. No. 2,825,868 Olsen Mar. 4, 1958
U.S. Pat. No. 2,852,653 Kooi Sept. 16, 1958
U.S. Pat. No. 2,853,613 Nilssen Sept. 23, 1958
U.S. Pat. No. 2,957,122 Manteuffel Oct. 18, 1960

In the Olsen patent, a temperature control circuit is provided by use of an inductance-capacitance circuit which is normally in resonance at the supply frequency. A heating resistor is included which heats the inductance. When the inductance is heated to the point where its core material reaches its Curie magnetic point, its magnetic permeability drops sharply, driving the circuit out of resonance and decreasing current in the heating resistor. This allows the temperature of the inductance to drop to the point where the resonant condition is re-established, increasing current through the heating resistor. This patent is not concerned with the problem of matching the temperature curve characteristics of a control device, and more particularly, does not involve a solid state device such as a transistor of silicon controlled rectifier, etc.

In the Kooi patent, a change in temperature changes the permeability characteristics of an inductance, which changes the frequency of an oscillator. A discriminator circuit provides a current output varying with frequency to provide a temperature control means. This patent also does not concern itself with correcting for the temperature curve characteristics of a control device, whether solid state or otherwise, nor does it utilize the resonance phenomenon.

The Nilssen patent is concerned with temperature compensation to correct for frequency drift occurring in a vacuum tube oscillator circuit. In this patent, a ceramic capacitor having a negative temperature coefficient is used in combination with an inductor in such a way that the resonance point of the combination changes with temperature. This change is used to change the frequency of the oscillator so as to correct the changes occurring in the vacuum tube because of temperature. This patent does not disclose or suggest a solution to the problem solved by the present invention, however, which may in one light be stated as how an input signal may be coupled to a solid state control device in such a way that changes occurring in the solid state control device because of temperature may be corrected for, with the result that a given value input signal will produce turn-on of the solid state device within very close tolerance limits, regardless of temperature change.

The Manteuffel patent, which is assigned to the same assignee as the present invention, discloses a temperature compensated voltage stabilizer in which changes involving the Curie point phenomenon occurring in a first saturable reactor because of temperature are compensated for by use of a second saturable reactor having a different Curie point characteristic. The Manteuffel patent also does not disclose or suggest means for coupling an input signal to a solid state device in such a way as to inherently compensate for changes occurring in the solid state device because of temperature.

It is an object of the present invention to provide a ground fault protection circuit utilizing a solid state control device which includes means for coupling an input signal indicating the ground fault condition to the solid state control device, which compensates for changes occurring in the turn-on characteristics of the solid state control device because of temperature.

It is another object of the invention to provide a circuit of the type described which does not require the use of components other than components which would be required or used for other purposed in any case.

It is another object of the invention to provide a circuit of the type described which is extremely simple, reliable, and which requires a minimum of electronic and electrical components.

It is another object of the invention to provide ground fault detection circuit of the type described which is usable in both the areas of high sensitivity ground fault detection for electric shock protection purposes and for power ground fault detection purposes.

It is another object of the invention to provide a ground fault detection circuit of the type described which is operative within the range of normally encountered ambient operating temperatures such as from about minus 35°C to about plus 65°C.

Other additional objects of the invention will in part become obvious and in part be point out in the following detailed description of the invention.

SUMMARY STATEMENT OF THE INVENTION

In accordance with the present invention, a ground fault detection circuit is provided including a differential transformer which produces an output signal upon the occurrence of a ground fault in the circuit. A resistor is connected in series with the output of the differential transformer, and a capacitor is connected across the output of the differential transformer so that the resistor-capacitor combination provides a filter for transient surge voltages of the input signal which are of such short time duration that operation of the protective circuit is not required or desired. The filtered output of the differential transformer is applied to the gate of a silicon controlled rectifier (SCR) so as to place the SCR in conducting condition when an output signal of predetermined amplitude or level occurs. The SCR is connected in series with a suitable voltage source and a trip-actuating device which causes tripping of a circuit breaker which interrupts the power to the circuit which has the ground fault.

A "Stabistor" or "double pellet diode" is connected across the output of the differential transformer immediately adjacent the SCR, and serves to by-pass voltage surges of a polarity opposite to that of the triggering signal of the SCR.

The differential transformer, the resistor and the capacitor, are selected so that they comprise a resonant circuit which is resonant at a frequency near but not necessarily at the operating line frequency of the circuit. In addition, at least one of the three components recited has characteristics which change within the operating temperature range of the circuit so as to change the resonant point of the combination and thereby to change the magnitude of the output signal which is applied to the SCR. These characteristics are selected, moreover, so that the change in the output signal varies in a manner closely matching the change in the turn-on voltage characteristic of the SCR which occurs because of temperature.

In a preferred form of the invention, the core material of the differential transformer is constructed of a material whose permeability changes with temperature to provide the result described in the foregoing paragraph.

DESCRIPTION OF FIGURES OF THE DRAWINGS

Referring to FIG. 1, the invention is shown as embodied in an electric circuit including input conductors 10 and 11 for connection to a suitable power source, not shown, such as a standard 115 volt, 60 hertz power system. One of the input conductors (conductor 11 in this case) is preferably grounded as shown. An electric circuit breaker 12 is included connecting the input connector 10 to a conductor 13 of a load circuit, to be described. The conductors 11 and 13 are connected to primary windings 14 and 15 of a differential transformer 16, also to be described more fully hereinafter. The primary windings 14 and 15 of the differential transformer 16 are connected by means of conductors 18 and 19 to a power consuming load 20.

Figure 1:
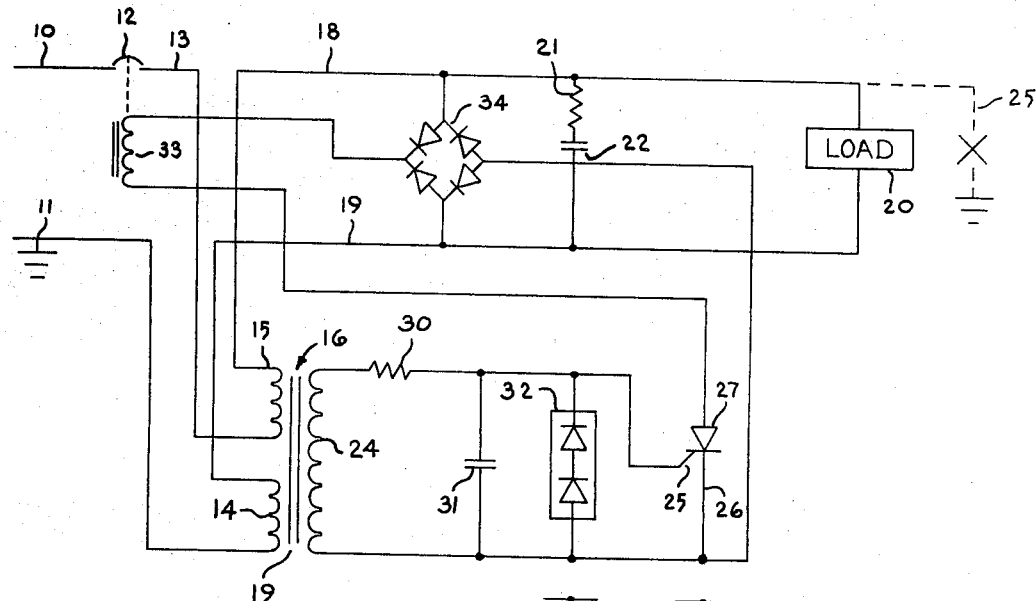
FIG. 1 is a circuit diagram of the circuit of one embodiment of the invention suitable for use for purposes of electric shock protection.

A voltage surge filter is provided comprising a resistor 21 and a capacitor 22 connected in series across the main circuit conductors 18 and 19. This filter serves to absorb relatively high frequency "noise" type voltage transients which might cause inadvertent or undesired operation of the solid state control device 27, to be described.

In normal operation, with the circuit breaker 12 in closed circuit position, power is delivered to the conductors 10 and 11. The circuit breaker 12 connects the conductor 10 to the conductor 13. It will be understood that a two-pole circuit breaker may be utilized instead of the single pole circuit breaker 12 shown in order to open both lines 10 and 11, if desired. Power flows from the conductors 13 and 11 through the primary windings 14 and 15 of the differential transformer 16, to the load 20 by means of the main circuit conductors 18 and 19.

For the purpose of providing ground fault detection, a differential transformer 16 is provided having a ferromagnetic core 17 and a secondary winding 24. As is well known in the art, the differential transformer 16 operates in such a manner that no output voltage appears across secondary winding 24 under normal conditions, i.e., so long as the currents flowing in the primary windings 14 and 15 are equal in magnitude and opposite in direction.

Upon the occurrence of a ground fault, such as indicated at 25, a current return path is created through ground to the grounded conductor 11 without passing through the primary winding 14. This creates an unbalance in the currents flowing in the primary windings 14 and 15, and creates a net flux in the core 17, which causes an output voltage to appear across the output winding 24. The output voltage of the secondary winding 24 is connected between the gate 25 and the cathode 26 of a silicon control rectifier 27. For the purpose of absorbing extra high voltage surges of transients which might appear across the secondary winding 24 and which are of very short time duration, a resistance-capacitance combination is provided including a resistor 30 connected in series with the winding 24, and a capacitor 31 which is connected across the output of the winding 24 of the output side of the resistor 30.

For the purpose of protecting the silicon controlled rectifier 27 from high voltage surges of a polarity opposite to its gate-cathode turn-on polarity, a protective device comprising Stabistor 32 is provided, connected across the output of the differential transformer on the output side of the capacitor 31. The Stabistor 32 is preferably of the "double pellet" or double-diode type, which does not conduct until and unless the forward voltage appearing across it exceeds a predetermined value, such, for instance, as 1 volt.

The SCR 27 is connected in series with a trip coil 33 which when energized serves to trip or cause automatic opening operation of the circuit breaker 12, from a suitable voltage source. In the form of the invention illustrated, the voltage source for the SCR 27 is provided by a full-wave rectifier indicated generally at 34, which is connected across the main circuit conductors 18 and 19 on the load side of the circuit breaker 12.

In operation, upon the occurrence of an unbalance in the currents in the primary windings 14 and 15 as previously described, a voltage appears across the output or secondary winding 24 of the differential transformer 16. As previously described, this voltage is applied between the gate electrode 25 and cathode 26 of the SCR 27. When this voltage exceeds the turn-on voltage of the SCR, which is about 0.4 to 0.7 volts, the SCR is placed in a conducting condition, and the voltage provided by the full-wave rectifier 34 causes current to flow through the SCR 27 and the trip coil 23, causing automatic opening or tripping of the circuit breaker 12, thereby disconnecting the incoming power from the load 20, and from the ground fault 25.

The ratio of the number of turns in the primary windings 14 and 15 to the turns of the secondary winding 24 is preferably selected so as to produce an output voltage sufficient to turn on the SCR 27 when the unbalance in the currents in the primary windings 14 and 15 is at least 5 milliamperes or more. The value of 5 milliamperes of unbalance current is chosen since this is well within the recognized level of current which could cause harm to a person if the differential current were passing through his body. Thus the circuit protects a person who might have created such a ground fault by standing on a grounded base and touching the conductor 18 or a conductive part in contact therewith, such, for instance, as the metal enclosure of the load 20.

The problem to which the present invention is particularly directed is that the SCR 27, like all thyristor devices, has voltage turn-on characteristics which vary with temperature of the SCR.

Figure 5:
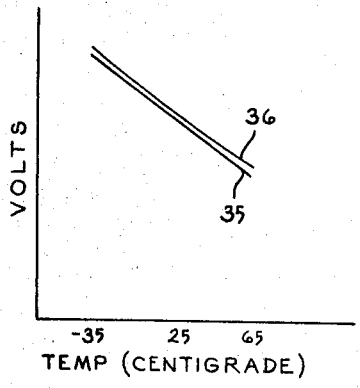
FIG. 5 is a graph showing, in superimposed relation, the trip signal-versus-temperature characteristics of a typical silicon controlled rectifier of the type used in the circuit of FIG. 1, and the output signal voltage-versus-temperature of the circuit of FIG. 1.

The manner in which the turn-on signal voltage of the SCR varies with temperature in the temperature range with which the invention is particularly concerned, i.e., minus 35° centigrade to about 65° Centigrade, is illustrated by the line 35 of the graph FIG. 5. It will be observed that such turn-on voltage decreases with increased temperature, varying from about 0.7 volts (700 millivolts) at minus 35° Centigrade to about 0.4 volts (400 millivolts) at plus 65° Centigrade. In the absence of some correction means, this would cause a condition in which a differential or ground fault current of the desired magnitude, i. e., 5 milliamperes would cause turn-on of the silicon controlled rectifier at 25° Centigrade, whereas a substantially larger current would be required to cause turn-on of the SCR 27 at lower temperatures, while a substantially lower value of differential or ground fault current would cause turn-on at higher temperatures, such as 65° Centigrade. This is undesirable, because at temperatures below 25° Centigrade, a ground fault current would be required which is higher than the desired level of 5 milliamperes, thereby not adequately protecting a person who might come in contact with the circuit in the manner previously described. Turn-on of the silicon controlled rectifier 27 by lower differential or ground fault current such as would occur at the temperatures above 25° Centigrade would also be undesirable since it would lead to "-nuisance" tripping, such as might occur because of unavoidable leakage paths in the circuit which would pass a ground fault current of an amount less than 5 milliamperes.

In accordance with the present invention, however, correction means is provided to cause turn-on or firing of the SCR at 5 milliamperes of differential or ground fault current, regardless of the temperature variation between the limits indicated. This is achieved by the present invention by constructing the components comprising the differential transformer 16, the resistor 30, and the capacitor 31, so that they constitute a circuit which is resonant at a selected frequency, and such that changes in temperature change the characteristics of at least one of these components in such a way as to modify the value of the output voltage appearing across the capacitor 31 in a manner closely matching the turn-on voltage variation characteristic of the SCR 27. In the illustrated embodiment of the invention, the differential transformer 16 is constructed with a core material having a temperature-responsive permeability characteristic. Since all such transformer core materials presently available have a permeability-versus-temperature characteristic which is either flat or *ascending* with temperature, the circuit components comprising the secondary winding 24, the resistor 30, and the capacitor 31 are selected so that they make up a circuit which moves *farther away* from the resonant point as temperature increases *above* a normal temperature of 25°C, and which moves *closer to* the resonant point at temperatures *below* 25°C. In accordance with the invention, moreover, by proper selection of the values of the circuit components, the curve of this variation is made to closely match the turn-on signal voltage-versus-temperature characteristic of the silicon controlled rectifier 27.

Figure 2:
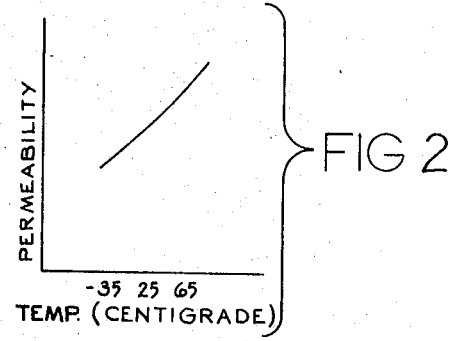
FIG. 2 is a graph showing the permeability-versus-temperature characteristics of the core material used in the embodiment of FIG. 1.

Referring to FIG. 2, the characteristic of a preferred core of material versus temperature is shown. It will be observed that the permeability of this material increases with increased temperature.

Figure 3:
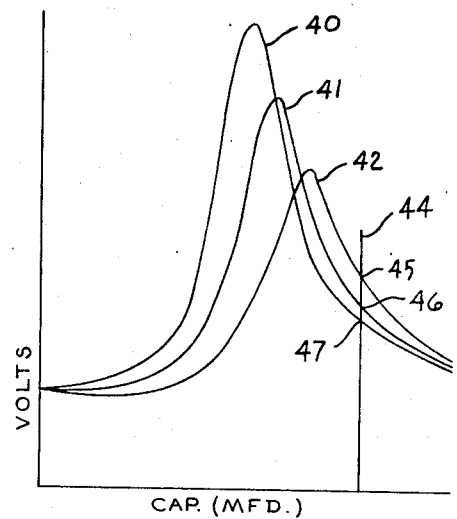
FIG. 3 is a graph showing the variation of output volts-versus-capacitance in a circuit of the type shown in FIG. 1.
Figure 4:
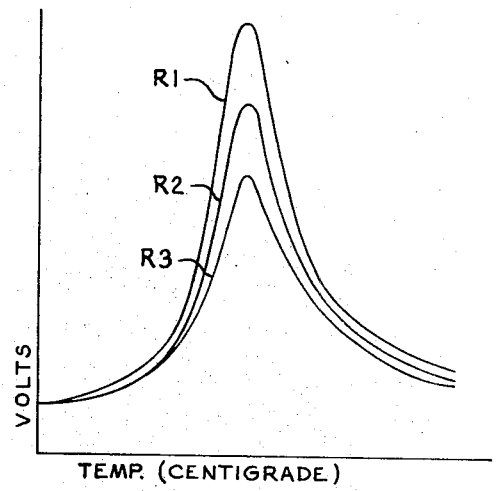
FIG. 4 is a graph showing the voltage-versus-temperature characteristics of three illustrative values of resistance in a circuit of the type shown in FIG. 1.

The effect of varying capacitance on the circuit, with other elements being held constant, is being shown in FIG. 3. The curves 40, 41, and 42 of this figure indicate the response of the circuit with varying capacitance, at three selected critical temperature points, i. e., 65°C for curve 40, 25°C for curve 41, and minus 35°C for curve 42. A value of capacitance is selected, in accordance with the invention, such as indicated by the vertical line 44 in this figure. This value of capacitance produces output voltages of the circuit at the three critical temperature points selected as indicated by the points 45, 46, and 47. These voltage values, as will be further described, fall within the desired range of voltages for turn-on of the SCR at such temperatures, in response to the pre-determined differential or ground fault current. The effect on the output voltage appearing across capacitor 31 with temperature at different values of resistance is indicated in the graph FIG. 4.

The line 35 of the graph of FIG. 5 shows the variation of signal voltage required to turn on the SCR 27 as the temperature of the SCR varies through the operating range indicated. It will be noted that at the lower temperatures about 0.7 volt or 700 millivolts is required to trigger the SCR to conducting condition, whereas at the higher temperatures this voltage drops to about 0.4 volt or 400 millivolts. It will be observed that the variation is almost 2 to 1.

Curve 36 in FIG. 5 shows the output voltage characteristics of the triggering circuit of the present invention with a constant differential or ground fault current of approximately 5 milliamperes, as the temperature is varied from about minus 35°C to about plus 65°C. It will be observed, that by means of the selection of core material and the winding turns of transformer 16 and values of resistance and capacitance 30 and 31 respectively, the output signal variation with temperature is made to closely match the trip signal variation of the SCR.

Figure 6:
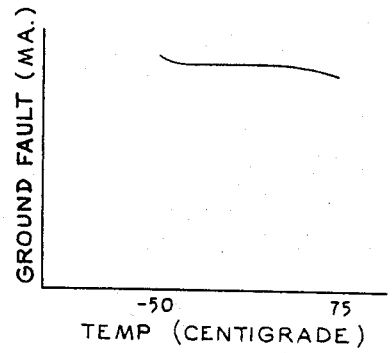
FIG. 6 is a graph showing the ground fault current, measured in milliamperes, required to turn on the SCR at different temperatures.

The over-all operational performance of the circuit of the invention is well demonstrated in the graph of FIG. 6, which shows the relation of the amplitude of ground fault or differential current required to cause tripping of the circuit breaker 12 at different temperatures, ranging from about minus 50°C to about plus 75°C. It will be observed in the critical operating range of minus 35°C to about plus 65°C, the curve is essentially flat, indicating that the circuit always causes tripping of the circuit breaker 12 whenever a ground fault of differential current exists of 5 milliamperes, regardless of temperature variation.

In one embodiment of the invention the following components were used:

| | |
|---|---|
| Resistor 30: | 2,000 ohms |
| Capacitor 31: | 0.20 microfarads |
| SCR 27: 2 amp.,200V | Cat. No. C106B, General Electric Company, Syracuse, New York |
| Core Material for Differential Transformer 16: | Core Number 3T5233-4, Arnold Engineering Company, Marengo, Illinois |
| Differential Current Transformer 16: | Primary Windings, five turns each No. 10 insulated copper wire; Secondary Winding, 1,500 turns No. 36 magnet wire |
| Resistor 21: | 22 ohms |
| Capacitor 22: | 0.10 microfarads |
| Rectifier 34: | Full-wave rectifier, 2-ampere capacity at 120 volts AC 60 Hertz |
| Stabistor (double-pellet diode) 32: 100 ma. 100 ma. | 1N4156, General Electric Co. Syracuse, N. Y. |
| Circuit Breaker 12: 30 ampere, 125 volts | General Electric Co. type TQL1130 |
| Trip solenoid 33: | 1,600 turns No. 35 magnet wire |

The "load" 20 was such as to draw 30 amperes at a power factor varying from 20 percent to 80 percent.

The power source (not shown) was a standard utility power source of 115 volts 60 cycles per second.

Tests of the above-described circuit showed that when ground fault current created by an intentional ground connector, with current monitored by a milliammeter reached a level of 5 milliamperes, the SCR 27 was triggered, and the solenoid 33 energized, tripping the circuit breaker 12. The operating characteristics of the circuit in the temperature range of about −50°C to about +75°C based on data developed in such tests are shown in the graph of FIG. 6 of the drawings.

The circuit was also tested by a person intentionally putting his body in the ground-fault path. In order to do this, it was necessary to wet the fingers and tightly grasp a metal tool, such as a screwdriver, to complete the circuit, in order to cause a current of 5 milliamperes to flow. The resistance of the human body, and the contact resistance presented by dry skin is normally such that at 115 volts, less than 5 milliamperes would flow. This is well below the level which will ordinarily cause physical harm, such as heart fibrillation, etc. See for, example, FIG. 7 of the aforementioned Dalziel U.S. Pat. No. 3,213,321. It will be noted, incidentally, that the Dalziel circuit operates to trip a circuit breaker when slightly more than 20 milliamperes of ground fault current flows.

The circuit illustrated has been tested in accordance with Underwriters' Laboratories proposed standard dated June 12, 1970 and has been found to meet all the requirements thereof. This proposed standards requires that a parallel combination comprising a resistor and a capacitor be connected between each of the load circuit conductors (such as 18 and 19) and ground. Different values of resistance and capacitance are set forth in the proposed standard, which are intended to simulate the capacitance and leakage effects of corresponding lengths of conductors. The most difficult conditions as regards electric shock protection are posed with load circuit conductors of maximum length, i.e., "over 200 but not over 250" feet in length. This situation is represented by the parallel combination of a resistor of 64,000 ohms and a capacitor of 0.015 microfarads connected between the "high side" load conductor (such as conductor 18) and ground. A similar parallel combination is required to be connected between the other load conductor (such as conductor 19) and ground.

The circuit of the present invention was tested with resistors and capacitors in place as described above and having the "250 feet" value of 64,000 ohms and 0.015 microfarads, respectively, and it successfully met all the requirements set out in the aforesaid proposed UL standard. A copy of the proposed UL standard referred to will be forwarded to the Patent Office for information purposes.

It will be observed that temperature correction for the purpose described has been achieved without the use of any circuit components which would not otherwise be required or desired. Thus the differential transformer 16 is, of course, necessary in order to provide a signal voltage (across its secondary winding 24) which indicates the existence of unbalance in the primary windings 14 and 15, and therefore indicates existence of a ground fault condition. Also, as previously noted, the resistor 30 and capacitor 31 serve to filter out or absorb transient input signal voltage surges which might otherwise cause undesired or "nuisance" operation of the circuit. The Stabistor or double-pellet diode 32, as previously explained, serves a purpose quite apart from the temperature correction function. As previously noted, this diode protects the SCR from over-voltages in the gate circuit which are of opposite polarity to the turn-on polarity.

A "Stabistor" or "double pellet diode" is preferred for this purpose to a simple diode in order to preserve the resonance characteristics of the trigger circuit.

In some operating conditions, such as when the ambient temperature is low, fault currents *below* the critical level of 5 milliamperes may produce a trigger circuit voltage of more than 0.5 volts without triggering the SCR. This is because of the correction characteristics of the circuit as described above, and is as it should be, since it is not desired to trip the breaker 12 unless a fault current of 5 milliamperes or more flows.

When the trigger voltage circuit produces an output of more than 0.5 volts, however, a single diode connected in the place of double diode 32 would conduct on every half-cycle of a polarity opposite to the turn-on polarity of SCR 27. The trigger circuit output would, in effect, be short-circuited on such half-cycles. This would destroy the balance of loading of the circuit on opposite half-cycles, and would make the resonance phenomenon useless.

The double-pellet diode, however, does not conduct until a voltage of about 1 volt exists in its forward or conducting direction. This, of course is well above the turn-on signal level of the SCR. On the other hand, the diode 32 becomes conductive at a value, such as 2 or 3 volts, which is substantially below a value which might cause damage to the SCR 27.

Figures 1A, 1B:
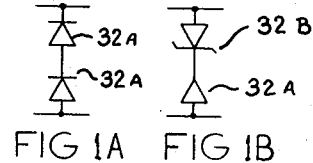

Alternatives to the use of the double-pellet diode 32 to protect the SCR 27 gate circuit from high reverse voltage are shown in FIG. 1A and FIG. 1B. In FIG. 1A, two discrete diodes 32A are shown, which are operationally directly comparable to the double-pellet diode 32. In FIG. 1B, a Zener diode 32B is shown, combined with a regular diode 32A, in confronting oppositely directed relation. The Zener diode is chosen such that its "avalanche" or breakdown voltage in reverse direction is significantly greater than the turn-on signal voltage of the SCR 27 but significantly less than a value which would harm the SCR 27 when applied in reverse direction. A Zener diode with avalanche breakdown characteristic of about 3 volts would therefore be chosen. The diode 32A serves merely to present short-circuiting of the transformer 16 output signal on half cycles of the opposite polarity.

Figure 7A:
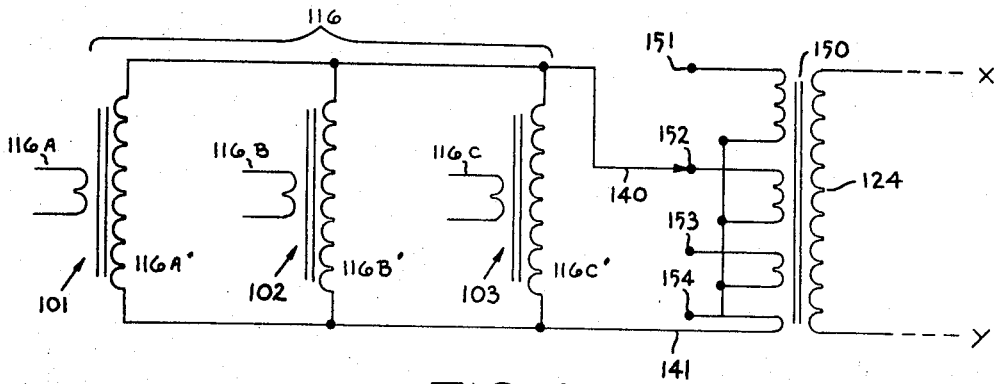
FIGS. 7A and 7B comprise a circuit diagram of another form of the invention, suitable for use as a ground fault detector operating in the power range for a three-phase circuit.
Figure 7B:
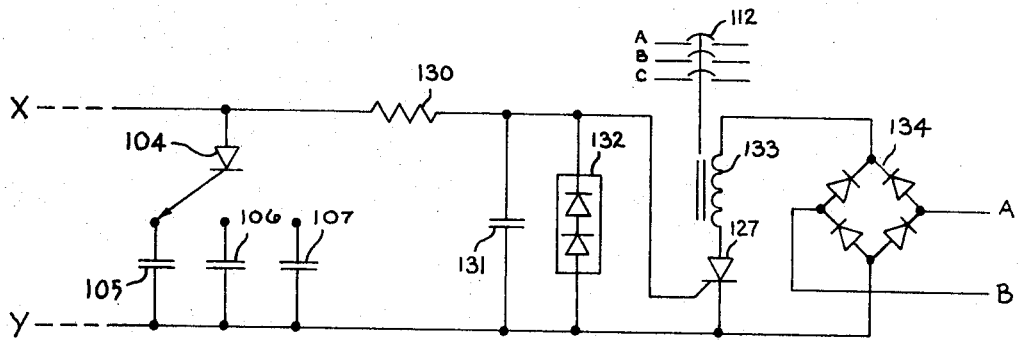

In FIGS. 7A and 7B a form of the invention is illustrated which is suitable for use as a *power* ground fault detector, i.e., a device for detecting and protecting against ground faults in the power range, such as from 10 to 100 amperes. This form of the invention is shown as adapted for use in a three-phase power system.

As illustrated, this circuit includes components directly comparable to those shown in FIG. 1, including transformer secondary winding 124, resistor 130, capacitor 131, double-pellet diode 132, and SCR 127, which controls a tripping solenoid 133 which serves to trip a three-pole circuit breaker 112, the SCR power being derived from a full-wave rectifier 134 connected across one of the phases of the circuit. In this form of the invention, however, the differential transformer comprises three separate transformers 101, 102 and 103, having primary windings 116A, 116B, and 116C respectively. Three secondary windings are also included 116A', 116B', and 116C'. When the system is in normal operation, the currents in the three primary windings add vectorially to zero, and likewise, the vector sum of the voltages appearing across the secondary windings 116A', 116B', and 116C' is zero, producing zero signal voltage between the conductors 140 and 141. When the sum of the voltage across 116A', 116B' and 116C' is other than zero, however, a net voltage appears across conductors 140 – 141.

An intermediate transformer 150 is also provided, for coupling the output of the conductors 140–141 to the remainder of the trigger circuit. The transformer 150 includes four primary windings which may be selectively utilized in order to provide a circuit which will cause tripping at predetermined different desired levels of ground fault current. Thus, for example, the terminal 151 may be used if it is desired to have tripping occur at 10 amperes of ground current, the terminal 152 for 20 amperes, the terminal 153 for 50 amperes, and the terminal 154 for 100 amperes. It will be understood that while the transformer 150 has been shown with four primary windings, this number may be varied as desired, such as to include six or more such windings.

The differential transformer 116 preferably is made up of 3 separate inexpensive silicon-iron, non-toroid current transformers 101, 102 and 103. Preferably the secondary windings of these transformers bear a high turns-ratio to the corresponding primary windings, and the secondary current is therefore in the order of milliamperes. The transformer 150 may be a high permeability toroidal transformer which, if desired, may be similar to the transformer 16 used in the electric shock protector circuit of FIG. 1. This permits the remainder of the circuit to be the same as that of FIG. 1, with the addition, if desired, of a "short time delay" means comprising the diode 104 and a selected one of the capacitors 105, 106, and 107. The short time delay capacitors are of relatively large ratings (of the order of 100 microfarads for typical delays) but are physically small since they operate at only low direct current voltage, such as one volt or less.

The operation of the circuit of FIGS. 6A–6B is such that if the instantaneous sum of the currents in the primary windings 116A, 116B, and 116C is zero, there is no input to the transformer 150, and no signal in its output circuit. On the occurrence of a ground fault of predetermined magnitude, a voltage appears across the conductors 140–141, and current flows in the corresponding primary winding of transformer 150. This produces an output voltage across secondary winding 124, and a voltage across capacitor 131 and turn-on of SCR 127. Turn-on of SCR 127 energizes trip solenoid 133 and trips the circuit breaker 112. If desired, of course, a fourth transformer (not shown) may be used in parallel with the transformers 101, 102, 103, and having its primary winding comprising a part of the neutral conductor of the circuit if one is utilized. Also, a single conventional torroidal or "window" type transformer may be used, if desired, with three or four primary windings on it and at least are secondary winding.

While the invention has been shown only in two specific embodiments, it will be readily appreciated that many modifications thereof may be made by those skilled in the art. It is therefore intended by the appended claims to cover all such modifications as found within the through spirit and scope of the invention.

I claim:

1. A ground fault protection circuit for a main power circuit which has at least 2 main circuit conductors comprising:
   a. current unbalance detection means for detecting an unbalance of instantaneous current values in said main conductors indicating the presence of a ground fault on said main power circuit and for producing an output electric signal in proportion to said current unbalance;
   b. a solid state electric control device capable of changing sharply from a first non-conducting condition to a second conducting condition upon application thereto of an electrical turn-on signal of predetermined magnitude;
   c. means connecting said output of said current unbalance detection means to said solid state control device to cause turn-on of said solid state control device upon occurrence of a signal of predetermined magnitude from said current unbalance detection means;
   d. said solid state control device having the characteristic that the value of said turn-on electric signal required to change said device from said non-conducting to said conducting condition varies with temperature along a predetermined magnitude-versus-temperature curve;
   e. means for connecting said solid state control device to the trip member of an automatic electric circuit breaker connected in said main circuit to disconnect said main circuit when said solid state control device is placed in said conducting condition;
   f. said connecting means connecting said current unbalance detection means to said solid state control device including means for modifying said electric signal produced by said unbalance detection means in accordance with temperature along a magnitude-versus-temperature curve substantially matching said magnitude-versus-temperature curve of said solid state control device, whereby the magnitude of unbalance of currents in said main conductors of said main power circuit required to cause said solid state control device to change from said non-conducting to said conducting condition remains substantially constant regardless of variations in temperature, throughout the operating range of temperature of said circuit.

2. A ground fault protection circuit as set forth in claim 1 wherein said means for modifying said electric signal produced by said secondary winding of said differential transformer includes resonant circuit means including inductance means, resistance means, and capacitance means, at least one of said inductance, resistance, and capacitance means varying with temperature to change the magnitude of electric signal applied to said solid state control device.

3. A ground fault protection circuit as set forth in claim 2 wherein said current unbalance detection means comprises a differential transformer having at least two primary windings thereon and having a secondary winding thereon, a signal being generated in said secondary winding only upon the occurrence of unbalance of currents in said primary windings.

4. A ground fault protection circuit as set forth in claim 3 wherein said differential transformer includes a magnetically permeable core material whose permeability characteristic changes with temperature to thereby provide said means for modifying said electric signal.

5. A ground fault protection circuit as set forth in claim 4, said circuit also including resistance and capacitance means connected to and combining with said secondary winding to form a resonant circuit whose resonance point varies with temperature because of said changes in permeability of said differential transformer core material.

6. A ground fault protection circuit as set forth in claim 5 wherein said resistance means comprises a resistor connected electrically in series between said secondary winding and said solid state control device and said capacitance means comprises a capacitor connected across the output of said secondary winding, said main power source being an alternate-current power source, and said resistor and said capacitor also serving to smooth said output of said secondary winding and further serving to absorb transient surges of said input signal having a time duration less than a predetermined time duration to avoid undesired operation of said solid state control device.

7. A ground fault protection circuit as set forth in claim 4 wherein said core material of said differential transformer comprises a material whose permeability increases with temperature in the range of temperatures from minus 50°C to about plus 75°C, and wherein said magnitude-versus-temperature change of said solid state control device decreases with increased temperature.

8. A ground fault protection circuit as set forth in claim 2 wherein said resonant circuit means is substantially out of resonance during the major portion of the operating temperature range of said circuit.

9. A ground fault protection circuit as set forth in claim 8 wherein said resonant circuit moves farther away from resonance with increasing temperature, to thereby decrease the magnitude of the output signal of said circuit with increasing temperature.

10. A ground fault protection circuit as set forth in claim 2, said controlled device being operated upon the occurence of a signal of a first polarity from said secondary winding, said circuit including unidirectional conducting means connected across the output of said secondary winding for signals developed by said secondary winding having a polarity opposite from said first polarity, said uni-directional conducting means becoming conducting in said direction only for values of control signal from said secondary winding exceeding a predetermined value higher than said turn-on voltage of said solid state control device and serving to protect said control device from excessively high signals in said opposite polarity developed by said secondary winding.

11. A solid state electronic control circuit comprising:
   a. control signal generating means for generating a control signal in response to the occurrence of a predetermined condition;
   b. a solid state electronic control device capable of changing sharply from a first non-conducting condition to a second conducting condition upon application thereto of an electrical turn-on signal of predetermined magnitude;
   c. means connecting said output of said signal generating means to said solid state control device so as to cause turn-on of said solid state control device upon the occurence of a signal of predetermined magnitude from said signal generating means;
   d. said solid state control device having the characteristic that the value of said turn-on signal required to change said device from said non-conducting to said conducting condition varies with temperature along a predetermined magnitude-vs.-temperature curve;
   e. means for connecting said solid state control device to a controlled member to be energized upon turn-on of said control device;
   f. said connecting means connecting said signal generating means to said solid state control device including means for modifying said control signal produced by said signal generating means in accordance with temperature along a predetermined magniture-vs.-temperature curve substantially matching said magnitude-vs.-temperature curve of said solid state control device, whereby the magnitude of signal generated by said signal generating means required to cause said solid state control device to change from said non-conducting to said conducting condition remains substantially constant regardless of variations in temperature throughout the operating range of temperature of said circuit.

12. A solid state electronic control circuit as set forth in claim 11 wherein said means for modifying said signal produced by said signal generating means includes resonant circuit means comprising inductance means, resistance means, and capacitance means, at least one of said inductance, resistance, and capacitance means varying with temperature to change the magnitude of electric signal applied to said solid state control device.

13. An electronic solid state control circuit as set forth in claim 12 wherein said means for modifying said signal produced by said signal generating means in accordance with temperature includes a transformer having a core material whose permeability increases with increased temperature to change said resonant circuit so as to be farther from its resonant point and to thereby decrease the magnitude of the control signal coupled to said solid state control device with increased temperature.

14. A solid state electronic control circuit as set forth in claim 12, said solid state control device being operated upon the occurence of a signal of a first polarity from said signal generating means, said circuit including uni-directional conducting means connected across the output of said signal generating means for signals developed by said signal generating means having a polarity opposite from said first polarity, said uni-directional conducting means becoming conducting in said direction only for values of control signal from said signal generating means exceeding a predetermined value higher than the magnitude of turn-on signal required to turn said solid state control device to conducting condition, and serving to protect said control device from excessively high signals generated by said signal generating means of said opposite polarity.

15. A solid state electronic control circuit as set forth in claim 14, wherein said uni-directional conducting means comprises a first diode, and wherein said circuit includes a Zener diode connected electrically in series with said first diode and having its direction of forward conductivity in a direction opposite to that of said first diode.

16. A solid state ground fault protection circuit for use in a three-phase electric power system, comprising:
   a. signal generating means for generating an electric signal in response to and in proportion to a ground fault existing in said three-phase power system;
   b. a solid state control device capable of changing sharply from a first and non-conducting condition to a second conducting condition upon the application thereto of an electrical turn-on signal of predetermined magnitude;
   c. means of connecting the output of said signal generating means to said solid state control device to cause turn-on of said solid state control device upon the occurence of a signal of predetermined magnitude from said signal generating means;
   d. said solid state control device having the characteristic that the value of said turn-on electric signal required to change said device from said non-conducting to said conducting condition varies with temperature along a predetermined magnitude-vs.-temperature curve;
   e. means for connecting said solid state control device to the trip member of an automatic electric circuit breaker connected in said main power circuit to disconnect said main power circuit when said solid state control device is placed in said conducting conditions;
   f. said connecting means including inductance, resistance, and capacitance means forming a resonant circuit, at least one of said inductance, resistance, and capacitance means varying with temperature to change the magnitude of said signal applied to said solid state control device in accordance with temperature, to match the magnitude-vs.-temperature change characteristics of said solid state control device.

17. A solid state ground fault protection circuit as set forth in claim 16 wherein said connecting means includes a transformer having a core material whose permeability changes with temperature to change the resonance characteristics of said resonant circuit.

18. A solid state ground fault protection circuit as set forth in claim 16 wherein said ground fault detection signal generating means comprises at least three current transformers, there being one such current transformer for each phase of said three-phase power circuit, each of said transformers having a primary with a relatively few winding turns and having a secondary with a relatively high number of winding turns, and means connecting said secondary windings of said current transformers electrically in parallel.

19. A solid state electronic ground fault protection circuit as set forth in claim 18 wherein said circuit also includes a coupling transformer between said secondary windings of said current transformers and solid state control device, said coupling transformer having its secondary winding arranged to form part of a resonant circuit including resistance, inductance, and capacitance means, said coupling transformer also having its core material comprising a material whose permeability changes with temperature to change the impedance of secondary winding and to change the resonant point of said resonant circuit.

20. A solid state ground fault protection circuit as set forth in claim 19 wherein said coupling transformer includes a plurality of primary windings each having a different number of turns, and means for selectively connecting said secondary windings of said current transformer to said primary windings of said coupling transformer to change the value of ground fault current required to cause actuation of said solid state control device.

* * * * *